United States Patent [19]

Omi et al.

[11] 4,433,908
[45] Feb. 28, 1984

[54] DEVICE FOR SETTING EXPOSURE QUANTITY

[75] Inventors: Kokichi Omi, Kawasaki; Yasuo Kuroda, Sagamihara, both of Japan

[73] Assignee: Canon Kabushiki Kaisha, Tokyo, Japan

[21] Appl. No.: 320,702

[22] Filed: Nov. 12, 1981

Related U.S. Application Data

[63] Continuation of Ser. No. 136,104, Mar. 31, 1980, abandoned.

[30] Foreign Application Priority Data

Apr. 9, 1979 [JP] Japan ............................ 54-43252

[51] Int. Cl.³ ............................................. G03B 27/80
[52] U.S. Cl. ........................ 355/68; 354/31; 354/432
[58] Field of Search ............... 354/50, 51, 31; 355/55, 355/56, 57, 58, 59, 60, 61, 62, 63, 67, 68, 69, 70, 71, 83

[56] References Cited

U.S. PATENT DOCUMENTS

| | | | |
|---|---|---|---|
| 3,563,143 | 2/1971 | Petersen | 355/68 X |
| 3,690,765 | 9/1972 | Rickard et al. | 355/68 X |
| 3,736,851 | 6/1973 | Ono et al. | 354/51 |
| 3,790,275 | 2/1974 | Huboi et al. | 355/68 |
| 4,018,526 | 4/1977 | Schroter | 355/68 |
| 4,124,295 | 11/1978 | Gardiner | 355/68 |
| 4,214,826 | 7/1980 | Uchida et al. | 354/31 |

*Primary Examiner*—Michael L. Gellner
*Attorney, Agent, or Firm*—Fitzpatrick, Cella, Harper & Scinto

[57] ABSTRACT

A device for setting exposure quantity for use in microfilm cameras projectors and so forth, wherein an object to be photographed or projected is divided into a plurality of sections, and a quantity of light reflected from, or transmitted through, the object is metered for each of the divided sections, thereby setting the exposure quantity in accordance with the section where the reflected or transmitted light quantity as metered is the maximum.

3 Claims, 9 Drawing Figures

DEVICE FOR SETTING EXPOSURE QUANTITY

This is a continuation of application Ser. No. 136,104, filed Mar. 31, 80, now abandoned.

BACKGROUND OF THE INVENTION

1. Field of the Invention

Generally speaking, when a document comprises character informations and picture informations, the base for the character informations is in most cases brighter than the base for the picture informations. In a document containing the abovementioned two sorts of informations, the character informations are more important than the picture informations. Therefore, in case the document of the abovementioned nature is recorded by a recording device such as a micro-film camera device, more legibility is demanded on the character informations than on the picture informations.

2. Description of the Prior Art

For example, the light-metering operation on a photographic object in the conventional recording device such as a micro-film camera device which photographs those informations contained in books and documents on microfilm has been done in most cases by averaging reflected light from a region 2, as designated in FIG. 1 of the accompanying drawing, in the entire photographic object 1 with use of a single light receiving element, and the like. Based on this light-metering, the exposure quantity is determined for the photo-taking operation. However, when a photographic object containing therein the character informations printed in black on a white background and the picture informations with more portions in grey or black therein as the background is subjected to the light-metering operation by such conventional method, the resulting image is very much influenced by the picture information section. On account of this, it becomes difficult to obtain an appropriate exposure quantity for the character information section, which inevitably results in such disadvantage that, when the photographic object is filmed, the character information section yields an inferior image contrast due to excessive exposure quantity, and the film thus obtained is hard to read and unsuitable for practical use. Also, in case of projecting the optical informations on the micro-film having both picture information section and character information section of one and the same film frame onto an image projecting screen for display, if the exposure quantity is determined by the conventional method, the image contrast at the character information section tends to become inferior.

SUMMARY OF THE INVENTION

It is therefore an object of the present invention to provide an improved device for setting the exposure quantity which, is capable of setting appropriate exposure quantity for recording.

It is another object of the present invention to provide an improved device for setting the exposure quantity which is capable of obtaining a recording medium having good reproducibility of informations.

It is still another object of the present invention to provide an improved device for setting the exposure quantity for recording which is suitable for photographing an object containing therein both character and picture informations.

It is yet another object of the present invention to provide an improved device for setting the exposure quantity which is suitable for use in a recording apparatus for preparing a micro-film.

DETAILED DESCRIPTION OF PREFERRED EMBODIMENTS

Figure 1:
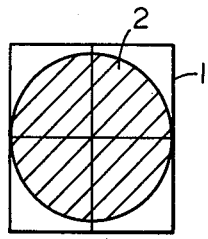
FIG. 1 is a schematic diagram for explaining the light-metering of an object by a conventional method.
Figure 2:
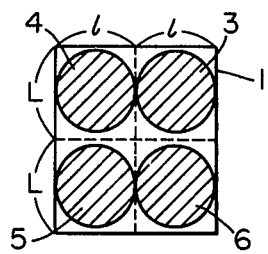
FIG. 2 is also a schematic diagram for explaining the light-metering of an object to be adopted in the present invention.

Referring to FIG. 2, reference numerals 3, 4, 5 and 6 respectively designate the light-metering regions in a photographic object 1 when it is divided into four sections, each having an area of "1×L". In most cases, ordinary documents contain, in all regions 3, 4, 5 and 6 character informations written on a white background (e.g. paper) in a darker color than the background such as, for example, black, or contain, in one or two portions of the divided sections 3, 4, 5 and 6 the picture informations which is darker than the paper. Therefore, by measuring the light reflected from, or transmitted through, the regions 3, 4, 5 and 6 and setting the exposure quantity in accordance with the maximum value of the reflected or transmitted light quantity, there can be prepared the information recorded film having good reproducibility of the character informations, whereby the defects inherent in the conventional method can be removed in almost all cases.

Figure 3:
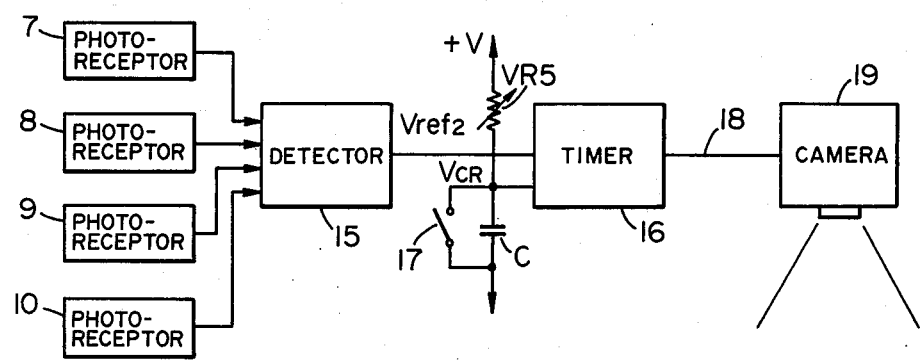
FIG. 3 is a block diagram of the exposure quantity setting device according to the present invention.

Referring now to FIG. 3 showing one embodiment of the exposure quantity setting device according to the present invention, reference numerals 7, 8, 9 and 10 respectively designate light reflected from, or transmitted through, the regions 3, 4, 5 and 6 when the photographic object is divided into four sections as shown in FIG. 2. These reflected (or transmitted) lights are received by light receiving elements 11, 12, 13 and 14 and electrical signals are formed in accordance with the quantities of light as received by the elements. A numeral 15 refers to a detector to detect the maximum value of these reflected (or transmitted) lights. Needless to say, when the object is in negative (i.e., the characters are written in white on a black background), the minimum value in the reflected (or transmitted) lights is detected. A numeral 16 refers to a timer circuit which compares the maximum output value (Vref1) from the detector 15 of the reflected (or transmitted) lights with a voltage (V$_{CR}$) generated by the use of a charging circuit composed of a resistor VR5 and a capacitor C, and a switch 17 for discharging an electric charge accumulated in the capacitor C, thereby producing an output exposure signal of a time length (exposure time) in accordance with the maximum value Vref1 on a signal line 18. Such exposure signal is applied to a photographic camera 19 to control the exposure time.

Figure 4:
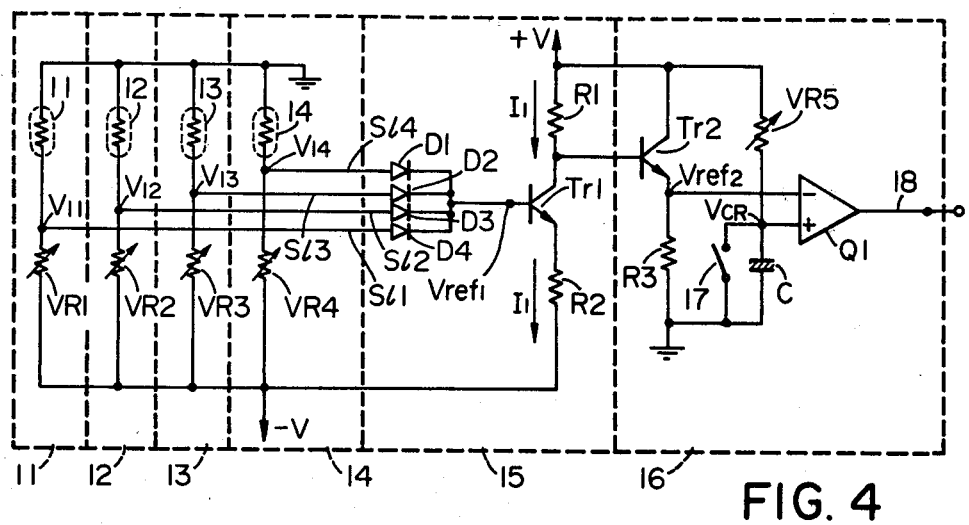
FIG. 4 is a circuit diagram of the main part of the exposure quantity setting device according to the present invention.

FIG. 4 illustrates further details of the exposure quantity setting device shown in FIG. 3, wherein detection of light intensity reflected from each of the regions 3, 4, 5 and 6 is carried out by the light receiving element (in this embodiment, CdS) 11, 12, 13 and 14. These light receiving elements are so constructed that they may have one and the same electrical characteristics. They are connected at one end thereof in series with variable resistors VR1, VR2, VR3 and VR4 and are commonly connected at the other end thereof with ground. The other ends of the variable resistors than those connected with the light receiving elements are also commonly connected so as to be further connected with a power source −V. Signal lines sl1, sl2, sl3 and sl4 are joined at the respective connecting points between the serially-connected light receiving elements and the variable resistors. To these signal lines, there are connected diodes D1, D2, D3 and D4 respectively. The other ends of these diodes are commonly connected and joined with the base of a transistor Tr1. Since these variable resistors VR1, VR2, VR3 and VR4 are set at a certain definite resistance value, when a quantity of light to be irradiated onto each of the light receiving elements 11, 12, 13 and 14 is equal at all, signal voltages V11, V12, V13 and V14 to be obtained on the signal lines sl1, sl2, sl3 and sl4 become equal accordingly. Since the light receiving elements lower their resistance values when light is irradiated onto them, there will be obtained high potentials on the signal lines connected with these light receiving elements. to which high intensity light has been irradiated. Assume now, for example, that reflected (or transmitted) light of the highest intensity has entered into the light receiving element 14. It is converted into an output voltage V14, and applied to the base of the transistor Tr1 as the maximum value Vref1 through the diode D1. The same voltage is further introduced as an input into a constant current circuit constructed with the transistor Tr1 and a fixed resistor R2. In this instance, if it is assumed that the current flowing through the fixed resistor R2 is I1, droppage in the voltage VR1 in a fixed resistor R1 connected to the collector of the transistor Tr1 in the same circuit will become VR1=I1×R1. In other words, a voltage VTr1 generated in the collector of the transistor Tr1 becomes VTr1=+V−VR1, hence the value of the voltage VTr1 is in an inverse proportion to the value of the current I1, i.e., it is in an inverse proportion to the intensity of the reflected light. Next, this voltage VTr1 is introduced as an input into an emitter-follower circuit constructed with a transistor Tr2 and a fixed resistor R3, and then produced as an output voltage Vref2 at the emitter side of the transistor Tr2.

Q1 refers to a differential type operational amplifier. A variable resistor VR5 and a capacitor C constitute a time constant circuit, an output (VCR) of which is introduced as an input into a nonreversible input terminal. A reference numeral 17 designates a constantly open switch to discharge an electric charge accumulated in the capacitor C.

Figure 5:
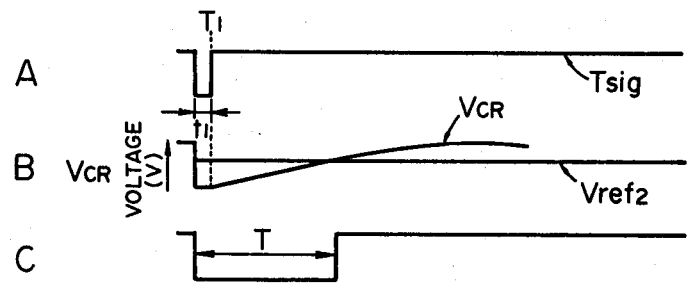
FIGS. 5A, 5B and 5C are respectively waveform diagrams in each part of the exposure quantity setting device shown in FIG. 4.

FIGS. 5A, 5B and 5C are timing charts for operations of the timer circuit 16. When a switch 17 is placed in its "on" state over a time instant t1 with a trigger signal Tsig, the electric charge accumulated in the capacitor C is discharged, and the potential VCR varies as shown in FIG. 5B. Next, when the switch is turned off at a time instant T1, a charge is accumulated in the capacitor C with a time constant to be determined by the values of the variable resistor VR5 and the capacitor C, the charging characteristic of which is represented by a VCR curve in FIG. 5B. Here, since the metered output of the reflected light is introduced as an input into the reversible input terminal of the operational amplifier Q1 as a value Vref2, an output from the signal line 18 of the operational amplifier Q1 reverses at a point VCR-Vref2 with the consequence that there is produced an output of a timer waveform as shown in FIG. 5C.

As will be apparent from the foregoing explanations, a time T, during which an exposure signal is led out, is small when the reflected light intensity is high, while it becomes large when the reflected light intensity is low. Therefore, by controlling the time, during which the shutter is kept open, with this timer, it is possible to control the camera 19 in such a manner that the film may be exposed in accordance with the reflected light from an object. As the consequence of this, there can be obtained the film having good legibility of the character informations. Incidentally, when the informations on the microfilm are to be projected on the screen for display, the construction may be such that luminance of the light source, which irradiates the microfilm with a value of Vref1, be controlled.

Figure 6:
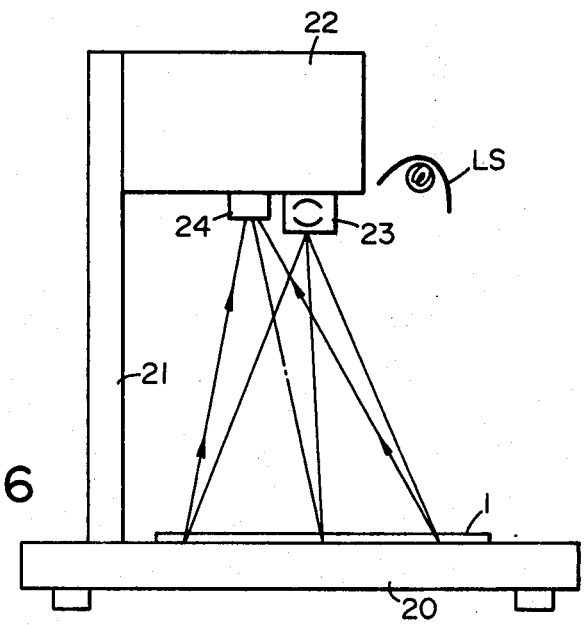
FIG. 6 is a schematic side elevational view of a recording apparatus, in which the exposure quantity setting device according to the present invention is incorporated.

FIG. 6 shows a side elevational view of the recording device, in which the exposure quantity setting device according to the present invention is incorporated. In this recording device, a photographic object 1 such as document is placed on a table 20 and illuminated uniformly by the light source LS. A pillar 21 is erected at one part of the table 20, on the top end of which the recording device 22 is fixed. The recording device 22 includes a camera having a photo-taking lens 23, and a control section having a light receiving section 24 consisting of the four light receiving elements 11 through 14, as shown in FIG. 4, to receive therein reflected light from the abovementioned photographic object 1.

It is to be noted that, although the camera constituting the recording device 22 is for producing the microfilm, the present invention is not limited to such construction, but is applicable to all types of recording device which records informations on a recording medium by light reflected from or transmitted through the photographic object, or electrical signals produced by these lights.

Also, in the above-described embodiment, explanations have been made on such construction alone, in which the photographic object is divided into a plurality of sections and the light metering is performed on the light reflected from these divided regions. However, the invention may also be applicable to such other construction, in which the light transmitted from these divided sections of the photographic object may be metered on the exactly same principle as mentioned in the foregoing.

Figure 7:
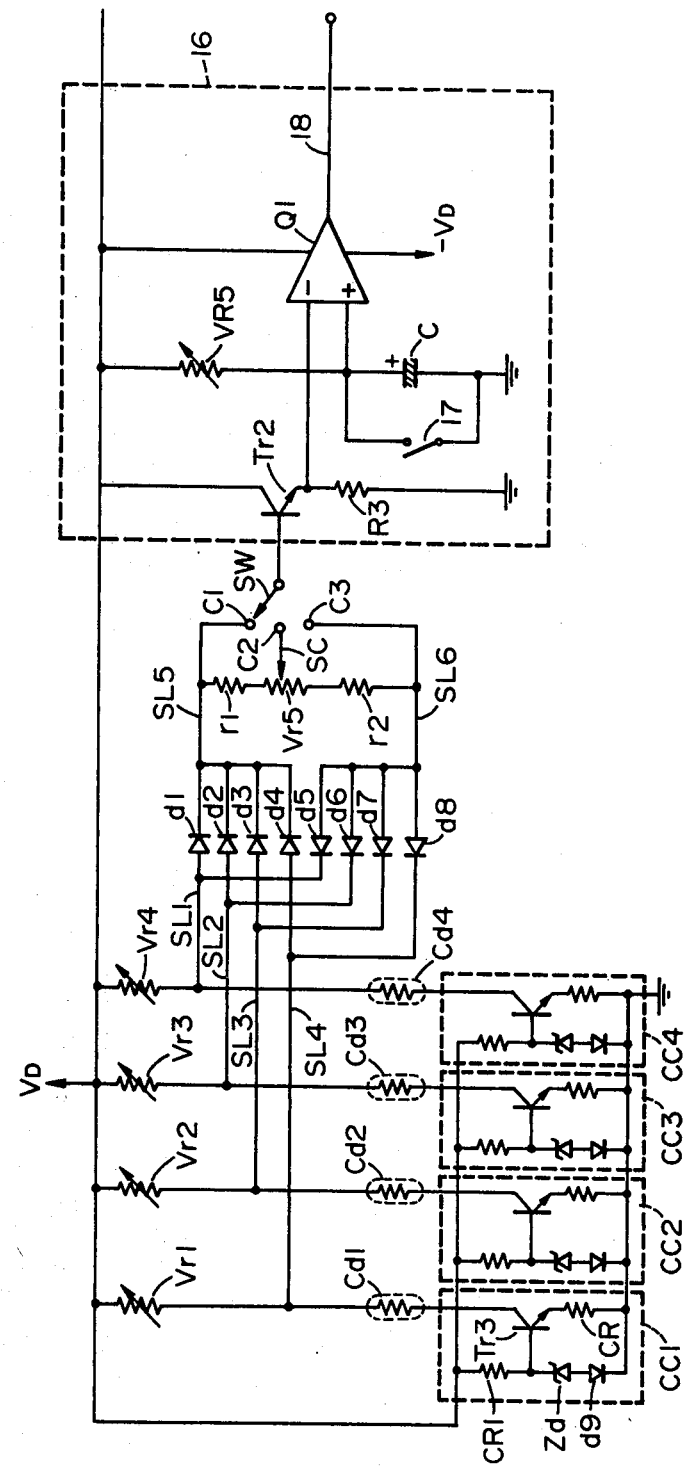
FIG. 7 is a circuit diagram of another embodiment of the exposure quantity setting device according to the present invention.

FIG. 7 illustrates another embodiment of the exposure quantity setting device according to the present invention which is capable of selectively using by means of a switch SW three exposure quantity setting modes, i.e., the first mode is set the exposure quantity in conformity to the region where the light receiving quantity is the maximum; the second mode to set the exposure quantity in conformity to the region where the light receiving quantity is the minimum; and the third mode to set the exposure quantity in conformity to an arbitrary value between the maximum and the minimum values of the light receiving quantity.

In FIG. 7, the light receiving elements Cd1 to Cd4, each being composed, for example, of CdS, are disposed in the same manner as the light receiving elements 11 to 14 already explained in reference to FIG. 4. That is, one ends of the light receiving elements Cd1 to Cd4 are respectively connected in series with adjusting means or variable resistors Vr1 to Vr4, and the other ends thereof are connected with constant current circuits cc1 to cc4, respectively. Such constant current circuit is of a known construction consisting of a transistor Tr3, resistors CR1 and CR2, a Zener diode Zd, and a temperature compensating diode dg. The circuit is so constructed that electric current flowing through a serially-connected circuit composed of each variable resistor (Vr) and each light receiving element (Cd) may be constantly maintained, even when the resistance value of the light receiving element (Cd) is varied. At the connections between the light receiving elements and the variable resistors, there are connected respective signal lines SL1 to SL4, to which one ends of each of the diodes d1 to d4 is connected. The other ends of the diodes is commonly connected with a signal line SL5. On the other hand, diodes d5 to d8 are connected with the abovementioned signal lines SL1 to SL4, respectively, in an opposite polarity to that of the abovementioned diodes d1 to d4. The other ends of these diodes d5 to d8 are commonly connected with a signal line SL6. These variable resistors Vr1 to Vr4 and the light receiving elements Cd1 to Cd4 are so constructed that, when these light receiving elements receive equal amount of light, equal voltages may be led out on the respective signal lines SL1 to SL4. The signal lines SL5 and SL6 are respectively connected with contacts C1 and C3 of the switch SW. Across the signal lines SL5 and SL6, there are connected resistors r1 and r2 having equally small resistance value and a variable resistor Vr5 having a resistance value greater than the abovementioned resistors r1 and r2, a slide contact SC of the variable resistor Vr5 being connected with a contact 2 of the abovementioned switch SW. As has already been explained in the foregoing, since the resistance value of the light receiving elements becomes correspondingly lowered as the intensity of the irradiating light becomes strong, there is led out at the contact C1 of the switch SW a voltage VD corresponding to a light receiving element which has received the minimum amount of light among the four light receiving elements, while there is led out at the contact C3 of the switch SW a voltage VL corresponding to a light receiving element which has received the maximum amount of light among these four light receiving elements. Furthermore, by adjusting the position of the slide contact SC of the resistor Vr5 to equally establish the resistance value aR between the contact C2 and the signal line SL5 and the resistance value bR between the contact C2 and the signal line SL6, there can be led out an average value of the voltages VD and VL at the contact C2. Incidentally, by adjustment of the contact piece SC of the variable resistor Vr5 to vary the abovementioned resistance values aR and bR, there can be obtained at the contact C2 a voltage value VM intermediate of the voltages VD and VL. Any one of these contacts C1 to C3 is selected by the switch SW for voltage application to the timer circuit 16, whereby the exposure time is determined by the operations as mentioned in the foregoing. Even in the embodiment shown in FIG. 7, the light receiving element CdS may receive light either reflected from, or transmitted through, the image original. The voltage VL is suited for use when the image original is a positive, while the voltage VD is suited for use when the image original is a negative.

Figure 8:
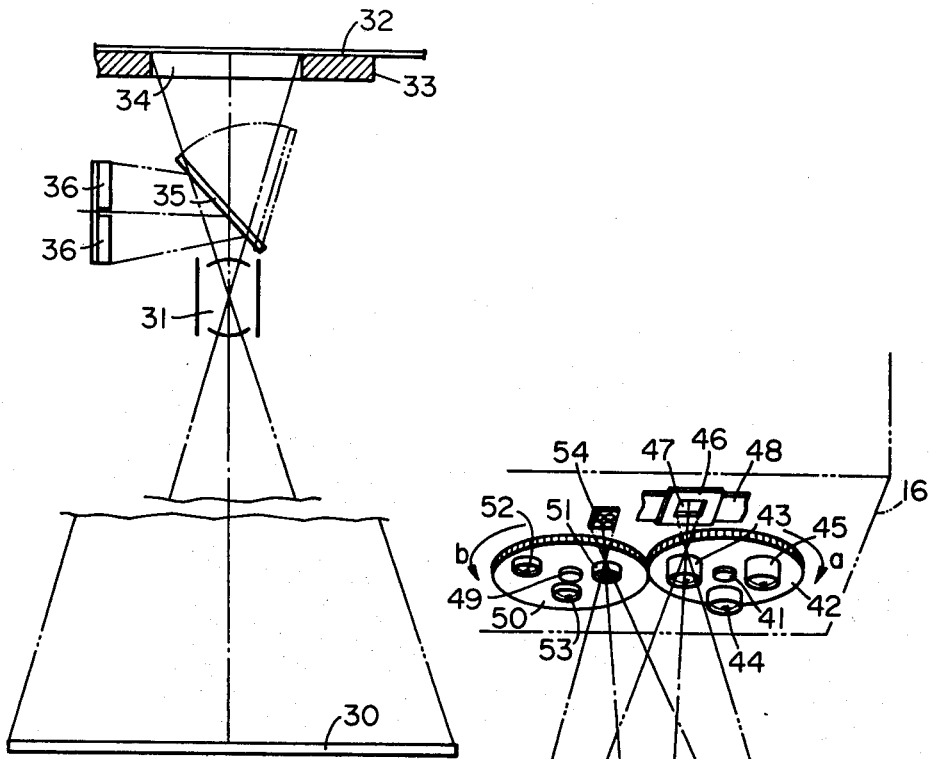
FIGS. 8 and 9 are respectively schematic side elevational view and a perspective view for explaining light projection onto the light receiving element.
Figure 9:
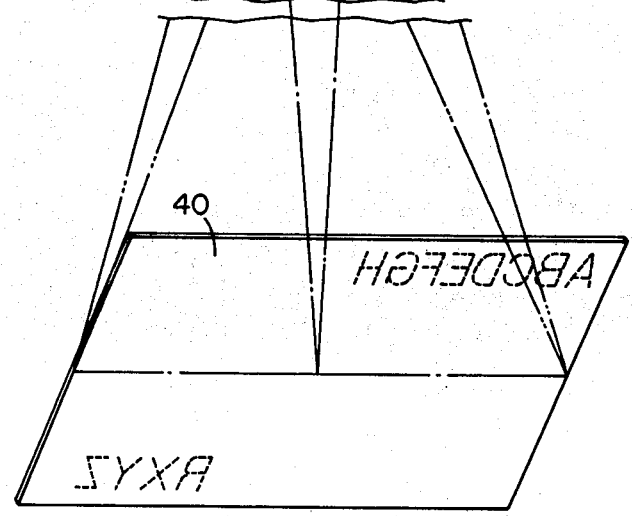

In the embodiment as explained in the foregoing, magnification of the lens remains unchanged at the time of projecting a document in a certain size onto a microfilm. It is, however, practically necessary that, in the recording or projecting device, lens magnification needs be changed for taking informations contained in the documents of various sizes such as A4, A3 and other sizes onto a film of a certain frame size. It is preferable that no change occurs in the light receiving regions of the light receiving elements which correspond to a plurality of such divided regions, even when the lens magnification is subjected to change. FIGS. 8 and 9 illustrate a preferred embodiment of such light receiving system.

In FIG. 8, a reference numeral 30 designates a document in A4 size, and informations in this document are projected onto a film 32 by a lens 31 through an opening 34 of an aperture mask 33. A mirror 35 is interposed between the lens 31 and the film 32. When the mirror 35 is disposed at a position as shown by a solid line, the light reflected by the mirror 35 is incident on four light receiving elements 36 as shown in FIG. 2. This mirror 35 is movable, and, by its movement to a position as shown by a dotted line, the light which has passed through the lens 31 is irradiated onto the film 32. Accordingly, in advance of the photo-taking operation, the mirror 35 is brought to the solid line position so as to irradiate light passed through the lens 31 onto the light receiving elements 36 to determine the exposure quantity, and, after the determination, the mirror 35 is shifted to the dotted line position to carry out the phototaking operation in accordance with the exposure quantity as determined. In such photo-taking device, even when the lens 31 is interchanged with another lens of a different magnification for photo-taking a document which differs in size from the document 30, the light receiving region of the four light receiving elements 36 is as shown in FIG. 2, which shows no change at all before the lens interchange.

FIG. 9 shows still another embodiment for keeping constant the light metering region in the photographic object.

In this embodiment, a lens 43 of a magnification N1, a lens 44 of a magnification N2 and a lens 45 of a magnification N3 are fixed on a circular disc 42 rotating around a shaft 41 as its center of rotation. In the illustration, the reflected light from the document 40 which has passed through the lens at the position of the lens 43 is projected onto a film 48 through an opening 47 of a mask 46. On the periphery of the circular disc 42, there are formed gear teeth which are meshed with other teeth formed on the periphery of another circular disc 50 which is freely rotatable around a shaft 49 as its center of rotation. On the circular disc 50, there are fixedly provided lens 51, 52 and 53 in correspondence to the respective lenses 43, 44 and 45. Magnification of the lens 51 is so set that the reflected light from the document 40 which has passed through the lens 51 may be light-metered in the light receiving device 54 consisting of four light receiving elements. Magnification of other lenses 52 and 53 is also determined in relation to the lenses 44 and 45. That is, the magnification of the lenses 44 and 45 is determined in such a manner that, when these lenses project a document in a certain size onto a film with a same size as that of the opening 47, they may also be light-metered as shown in FIG. 2 in the abovementioned light receiving device 54. Accordingly, when any one of the lenses 43, 44 and 45 is selected by rotating the circular disc 42 due to change in size of the document, the circular disc 50 also rotates in association with this rotation of the circular disc 42 with the consequence that there is selected a lens corresponding to the abovementioned selected lens of a magnification N.

What we claim is:

1. An exposure quantity setting device comprising:
   (a) detection means including a plurality of light detectors for receiving light from a plurality of divided portions in an object, and for forming a light signal corresponding to the intensity of the light received;
   (b) first selection means for selecting the maximum light signal obtained from the light detector which has detected the maximum amount of light among said plurality of light detectors;
   (c) second selection means for selecting the minimum light signal obtained from the light detector which has detected the minimum amount of light among said plurality of light detectors;
   (d) third selection means including intermediate light signal forming means for forming an intermediate light signal between the maximum and minimum light signals, means for varying the intermediate signal level formed by said third selection means between the maximum and minimum light signal levels, and means for selecting among the maximum light signal obtained from said first selection means, the minimum light signal obtained from said second selection means, and the intermediate light signal obtained from said intermediate light signal forming means; and
   (e) exposure quantity setting means for setting an exposure quantity by a light signal selected by said third selection means.

2. An exposure setting device, comprising:
   detecting means including a plurality of detectors for receiving light from different areas of an object and for producing signals representing the intensities of the light received;
   adjusting means disposed on each of said detectors for adjusting said signal level;
   first selecting means for selecting the signal representing the maximum intensity and the signal representing the minimum intensity;
   second selecting means for selecting one of the maximum intensity signal, minimum intensity signal and an intermediate signal between the maximum and minimum intensity signals;
   means for varying the intermediate signal level between the maximum and minimum intensity signal levels; and
   means for setting an exposure amount in accordance with the signal selected by said second selecting means.

3. The exposure quantity setting device as set forth in claim 2, further comprising an optical system for irradiating light from an object onto said detection means, said optical system having optical system magnification changing means for making constant the size of an image of the object to be irradiated onto said detection means, even when the size of the object changes.

* * * * *